UNITED STATES PATENT OFFICE.

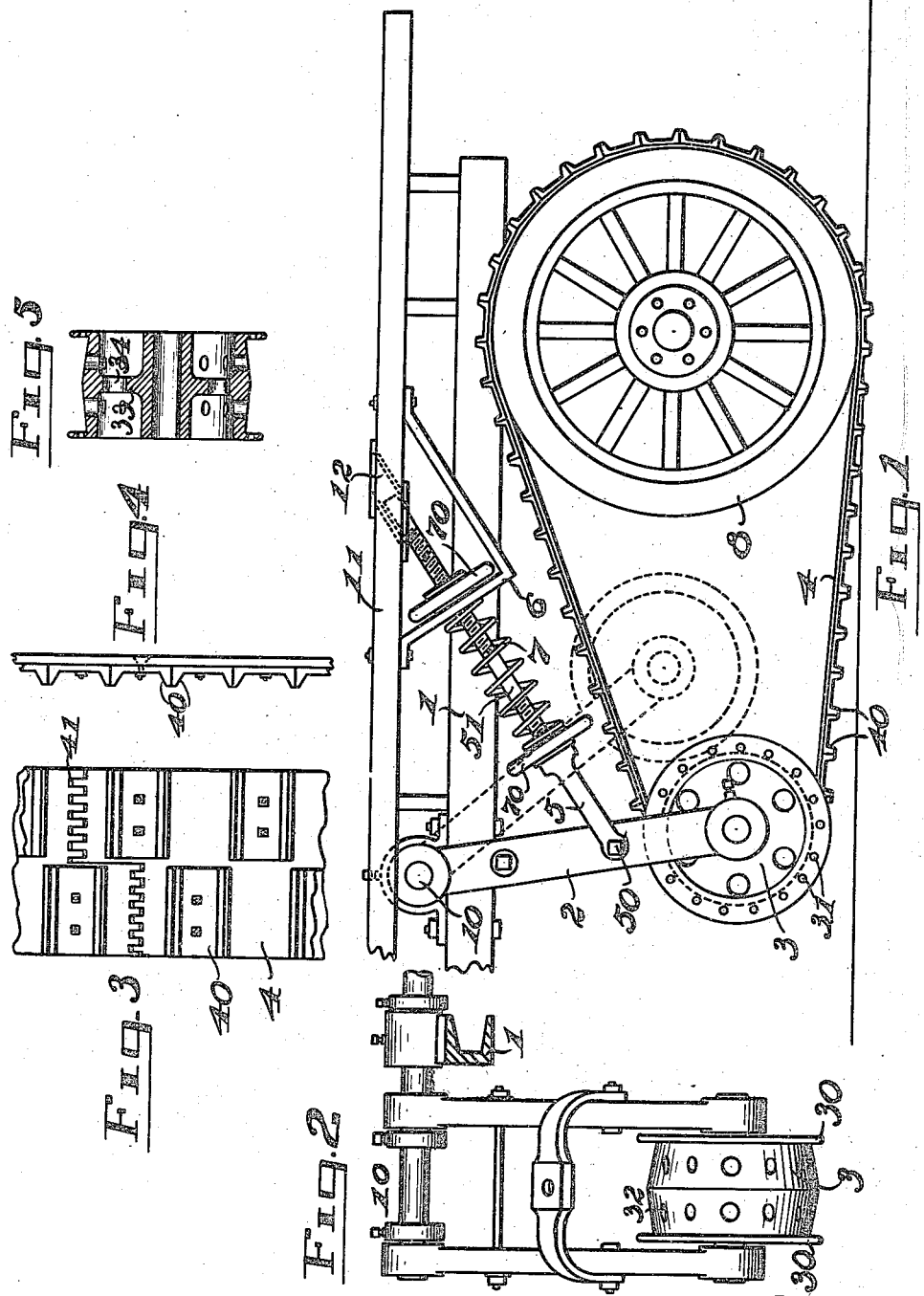

REINDER B. TOLSMA, OF EVERETT, WASHINGTON.

TRACTION-BELT FOR AUTOCARS.

1,256,744.

Specification of Letters Patent.  Patented Feb. 19, 1918.

Application filed May 19, 1917. Serial No. 169,631.

*To all whom it may concern:*

Be it known that I, REINDER B. TOLSMA, a citizen of the United States, and resident of the city of Seattle, county of King, and State of Washington, have invented certain new and useful Improvements in Traction-Belts for Autocars, of which the following is a specification.

My invention relates to traction devices for application to auto driven vehicles and employs an endless belt which is passed about one of the traction wheels of the vehicle and about an idler wheel which is located in advance of the traction wheel, whereby the belt is laid down as a supporting trackway for the vehicle wheel in advance of said wheel.

The object of my invention is to produce a device of this general character which shall be simple and effective and which may be applied or removed, as desired, to suit varying conditions.

The particular features which I deem to be new will be hereinafter described and then particularly pointed out in the claims.

The type of construction which I now prefer is shown by the accompanying drawings.

Figure 1 is a side view of a portion of a car or automobile having my invention applied thereto.

Fig. 2 is a view showing the idler wheel and its frame, looking from front to rear of the car.

Figs. 3 and 4 are, respectively, face and edge view of a small portion of the belt employed.

Fig. 5 is a diametrical section of the idler wheel.

In the drawings 1 represents a portion of the frame of the automobile or car. Upon this is mounted a shaft 10 upon which is pivoted a frame 2. In the lower or swinging end of this frame is journaled an idler wheel 3. This frame, with its idler wheel, is normally held down and forward in such manner as to maintain the trackway belt 4 in fairly taut condition.

This belt has an inner web which may be of any suitable belting material, such for instance, as canvas, rubber or leather. Secured to its outer surface are a series of traction increasing or gripping blocks, or dogs, 40. These may vary widely in their construction. The construction herein shown consists of short sections of a channel bar having only a slight flange. These blocks are made of a length substantially equal to half the width of the belt and are secured to the belt in such way as to extend from the outer edge of the belt to or adjacent the center line of the belt. They are also preferably arranged in staggered relation, that is with the blocks of one row opposite spaces in the adjoining row.

The two ends of the belt are joined in any suitable manner which will permit a flexible action. I prefer to make the joint in the spaces between the traction plates 40, as has been shown in Fig. 3, wherein the joint is shown at 41 and is of a character which has a construction resembling that of a hinge, the two parts being secured together by a pin. As the construction of this joint is not a novel one, further description thereof is not deemed necessary. Any type of joint found suitable for the purpose will suffice.

The frame 2 carrying the idler wheel 3 is held downward and forward in a yielding manner by a suitable construction. That herein illustrated is as follows:

Pivoted to the frame 2 at point 50 is a yoke 5. Secured to this yoke is a rod 51 which is supported at its opposite end by passing through a supporting or guide member 6, which member is herein shown in the form of a bracket secured to the bottom side of the floor 11 of the car. The floor of the car, as in the construction herein shown, also has an opening at 12 through which the tip of the rod 50 may project and reciprocate as desired.

Surrounding the rod 51 between the bracket 6 and the frame 2, is a coiled spring 7. This spring is coiled open so as to act under compression. The rod 51 is threaded and has a nut interposed between the end of the spring and the yoke 5. This nut, for convenience, may be given a rim 70, making of the same in effect a small hand wheel. This enables adjustment of the nut to be readily accomplished.

Upon the opposite side of the bracket 6 from the spring 7, is a similar adjusting nut 71. The latter acts to limit the forward swing of the frame 2, while the nut 70 acts to control the spring thrust exerted by the spring 7 before any compression takes place. By means of the above construction, the idler wheel 3 is permitted to yield as may be necessary as it passes over obstructions.

The wheel 3 is given a considerable crown, as is clearly shown in Fig. 2. This crown insures proper leading of the belt upon the pulley, under the well recognized principle applying to pulleys and belts. The wheel 3 is, in addition, supplied with side flanges 30, to further safeguard the retention of the belt upon the pulley. The division of the traction member 40 into half lengths, as described and as shown in Fig. 3, permits the belt to bend upon a central longitudinal line, as is necessary to fit upon the surface of the pulley.

The flanges 30 of the wheel 3, are provided with openings 31, and the periphery of the wheel with openings 32. The rim of the wheel is also connected with the hub only by a central web 33, which web is also provided with holes or perforations 34. The object of these perforations is to permit the ready discharge or extrusion of mud, snow, or other similar material, which may get between the belt and the pulley. The shape of the pulley and the position of these bolts is such that any material forced through these holes by the belt will be discharged exteriorly of the pulley.

By means of the construction herein shown, a belt is laid down in advance of the traction wheel 8 of the car, which will increase the bearing surface and also increase the traction grip, thus enabling the car to run over softer ground than would otherwise be possible and also prevent slippage of the wheel. The device may also be readily applied or removed to suit the conditions existing at the time. In the manner of mounting shown, the frame 2 is slipped upon the projecting end of the shaft 10 and locked in place thereon. It is, therefore, easily removed if desired.

What I claim as my invention is:

1. A traction device for an auto-driven road vehicle comprising an arm pivoted forwardly of a traction wheel and extending downwardly, a belt wheel journaled upon the lower end of said arm, a traction belt passing about said wheel and the traction wheel, and means acting upon the said arm to automatically swing it downwardly and forwardly and permitting it to be raised by engagement with an obstruction.

2. A traction device for automobiles comprising an arm pivoted to the frame by a horizontal transverse pivot located forwardly of a traction wheel and extending downwardly, an idler wheel journaled on said arm, a belt passing over said wheel and over a traction wheel of the automobile, a thrust rod pivoted to the wheel carrying arm, a guide for said rod and a spring acting through said rod to hold the arm downward.

3. A traction device for automobiles comprising an arm pivoted to the frame by a horizontal transverse pivot located forwardly of the traction wheel and extending downwardly, an idler wheel journaled on said arm, a belt passing over said wheel and over a traction wheel of the automobile, a thrust rod pivoted to the wheel carrying arm, a guide for said rod, a spring surrounding said rod and having a thrust support from the automobile frame, an adjustable thrust support for said spring carried by the rod, and an adjustable extension stop carried by the rod.

4. A traction device for automobiles, a frame pivoted upon a horizontal transverse pivot located in front of a traction wheel of the automobile, an idler wheel journaled on the lower end of said frame, a belt passing over said idler and traction wheels, a yoke pivoted to said frame, a threaded rod secured to said yoke, a bracket carried by the automobile frame and having guiding support for said rod, a spring surrounding this rod and having a thrust bearing upon the bracket, and a thrust nut carried by the rod and engaging the other end of the spring.

Signed at Seattle, Washington, this 14th day of May, 1917.

REINDER B. TOLSMA.